No. 861,442. PATENTED JULY 30, 1907.
P. J. EBY.
FRUIT CORER.
APPLICATION FILED MAR. 1, 1907.

Inventor
Perry J. Eby

Witnesses
Matthew Subler
E. M. Theobald.

By R. J. McCarty
his Attorney

UNITED STATES PATENT OFFICE.

PERRY J. EBY, OF TROTWOOD, OHIO.

FRUIT-CORER.

No. 861,442.

Specification of Letters Patent.

Patented July 30, 1907.

Application filed March 1, 1907. Serial No. 360,044.

*To all whom it may concern:*

Be it known that PERRY J. EBY, a citizen of the United States, residing at Trotwood, in the county of Montgomery and State of Ohio, have invented certain new and useful Improvements in Fruit-Corers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fruit corers, and consists specifically in a device for removing the eyes from pineapples.

The object of the invention is to provide an implement of the above character which combines to a desirable extent, simplicity, inexpensiveness and efficiency. To these ends, the device is constructed of a single piece of metal so formed and designed as to embody the desired resiliency and effectiveness as hereinafter described and claimed.

Preceding a detailed description of the invention, reference is made to the accompanying drawings, of which—

Figure 1:
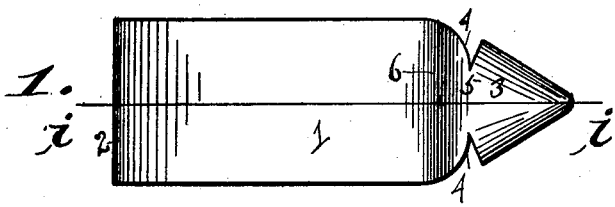
Figure 2:
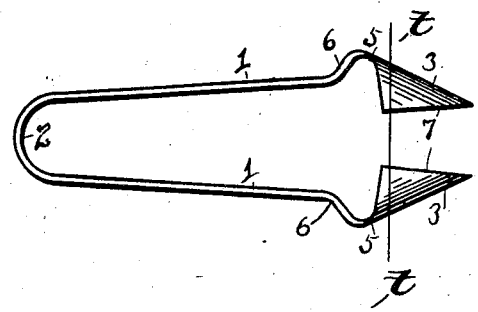
Figure 3:
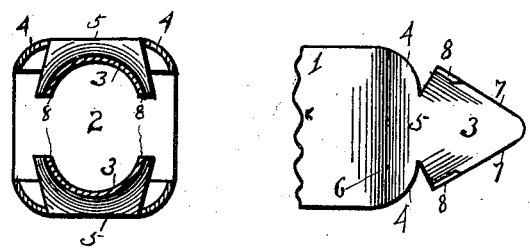
Figures 4, 5:
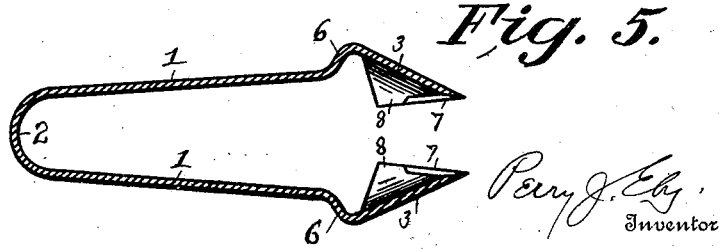

Figure 1, is a longitudinal side elevation of the device. Fig. 2, is an edge view of the same showing the device in its normal position which is due to its inherent resiliency. Fig. 3, is a sectional view on the line *t—t* of Fig. 2. Fig. 4, is a longitudinal sectional view on the line *i i* of Fig. 1. Fig. 5, is a view of the inner side of one of the blades or leaves showing the inner side of the semi-cone-shaped end.

In a detailed description of the invention, similar reference characters indicate corresponding parts.

The device consists of two leaves or blades 1 1 which lie substantially parallel and are joined at one end of the device by a substantially semi-circular bend 2 which imparts to the leaves or blades the requisite resiliency to maintain them normally separated as shown in Fig. 2. From this normally separated position, the blades are pressed inwardly by the hand in operating the implement. The operative or effective end of the device is formed into two semi-conical shaped blades 3 3 which are extended from the leaves 1 1 and are formed by cutting inwardly in the leaves 1 1 as at 4 4. These inwardly-cut portions 4 4 enable the extreme ends of the leaves or blades 1 1 to be bent inwardly to form the semi-conical-shaped blades 3 3. These semi-conical-shaped blades when brought together complete a cone which enters the pineapple as said ends are brought together by the hand in the act of inserting the implement. When the leaves 1 1 are so stamped or cut out as at 4, the semi-conical-shaped blades 3 3 join the said leaves by necks 5 from the side or end limits of which said blades are bent inwardly. On the inner sides of these points and adjacent thereto, shoulders 6 are formed which lie substantially at the ends of the leaves 1 1 and provide abutments for the thumb and fingers of the operator in inserting the device in the pineapple and in pressing the conical shaped blades together in the act of inserting said blades. The straight or inner edges of the semi-conical shaped blades 3 3 are provided with edges 7 7, in the rear of which are flat abutting surfaces 8 8 which prevent said blades from overlapping when brought together under the pressure of the hand due to inserting the implement in the pineapple.

Having described my invention, I claim:

A fruit corer consisting of a single piece of sheet metal bent to form substantially parallel arms, the outer portions of said arms being bent outwardly and cut transversely at both sides and then turned inwardly and curved to form corresponding semi-conical following members, the edges of which contact throughout their length when in closed position, said edges being provided with abutting surfaces formed by bending a portion of said edge at right angles to the plane of said edge.

In testimony whereof I affix my signature, in presence of two witnesses.

PERRY J. EBY.

Witnesses:
R. J. MCCARTY,
C. M. THEOBALD.